United States Patent
Downey et al.

(10) Patent No.: US 7,607,684 B2
(45) Date of Patent: Oct. 27, 2009

(54) INTEGRATED INFLATABLE CURTAIN DEPLOYMENT RAMP INTO VEHICLE BODY TRIM

(75) Inventors: Brian Downey, Westland, MI (US); Michael Bunce, Ann Arbor, MI (US); Paul Peruski, Sterling Heights, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 589 days.

(21) Appl. No.: 11/384,880

(22) Filed: Mar. 20, 2006

(65) Prior Publication Data
US 2007/0216141 A1    Sep. 20, 2007

(51) Int. Cl.
  *B60R 21/213*    (2006.01)
  *B60R 21/16*    (2006.01)
(52) U.S. Cl. ............... 280/730.2; 280/728.2; 280/728.3
(58) Field of Classification Search ............... 280/730.2, 280/728.3, 728.2; B60R 21/213
See application file for complete search history.

(56) References Cited

U.S. PATENT DOCUMENTS

| | | | |
|---|---|---|---|
| 5,265,903 A | 11/1993 | Kuretake et al. | |
| 5,273,309 A | 12/1993 | Lau et al. | |
| 5,322,322 A | 6/1994 | Bark et al. | |
| 5,462,308 A | 10/1995 | Seki et al. | |
| 5,480,181 A | 1/1996 | Bark et al. | |
| 5,540,459 A | 7/1996 | Daniel | |
| 5,588,672 A | 12/1996 | Karlow et al. | |
| 5,605,346 A | 2/1997 | Cheung et al. | |
| 5,660,414 A | 8/1997 | Karlow et al. | |
| 5,755,457 A | 5/1998 | Specht | |
| 5,788,270 A | 8/1998 | Håland et al. | |
| 5,791,683 A | 8/1998 | Shibata et al. | |
| 5,884,937 A | 3/1999 | Yamada | |

(Continued)

FOREIGN PATENT DOCUMENTS

DE    41 34 995    3/1993

(Continued)

OTHER PUBLICATIONS

Passive Safety (Interior). (Web page) http://www.daihastsu.com/technology/safety/inter/inter.html.

(Continued)

*Primary Examiner*—Paul N. Dickson
*Assistant Examiner*—Joselynn Y. Sliteris
(74) *Attorney, Agent, or Firm*—Young Basile

(57) ABSTRACT

A pillar trim component can include a main body portion and an airbag support portion extending from the main body portion. An attachment portion can include an outwardly extending portion connected to the airbag support portion, an angled portion connected to an outer end of the outwardly extending portion, and an inboard stabilizing web extending between the outwardly extending portion and the angled portion. An airbag positioning portion can be defined by at least a portion of an upwardly extending wall of the airbag support portion angled inboard toward the main body portion. An airbag guide portion can be defined by a deployment surface located above the main body portion and extending between the main body position and the airbag support portion. A headliner retaining portion can be defined by a recess formed between the deployment surface and the main body portion.

34 Claims, 6 Drawing Sheets

U.S. PATENT DOCUMENTS

| | | | |
|---|---|---|---|
| 6,056,316 | A | 5/2000 | Yamaji et al. |
| 6,079,732 | A | 6/2000 | Nakajima et al. |
| 6,099,029 | A | 8/2000 | Haland et al. |
| 6,129,377 | A | 10/2000 | Okumura et al. |
| 6,142,506 | A | 11/2000 | Patel et al. |
| 6,158,767 | A | 12/2000 | Sinnhuber |
| 6,179,324 | B1 | 1/2001 | White, Jr. et al. |
| 6,224,092 | B1 | 5/2001 | Sakamoto et al. |
| 6,254,123 | B1 | 7/2001 | Urushi et al. |
| 6,279,941 | B1 | 8/2001 | Nakajima et al. |
| 6,302,434 | B2 | 10/2001 | Nakajima et al. |
| 6,305,707 | B1 | 10/2001 | Ishiyama et al. |
| 6,328,333 | B1 | 12/2001 | Patel et al. |
| 6,332,628 | B1 | 12/2001 | Tschaeschke |
| 6,333,515 | B1 | 12/2001 | Kubota et al. |
| 6,371,512 | B1 | 4/2002 | Asano et al. |
| 6,402,192 | B2 | 6/2002 | Haland et al. |
| 6,450,529 | B1 | 9/2002 | Kalandek et al. |
| 6,485,048 | B2 | 11/2002 | Tajima et al. |
| 6,485,049 | B1 | 11/2002 | Prottengeier et al. |
| 6,494,480 | B2 | 12/2002 | Haland et al. |
| 6,520,533 | B2 | 2/2003 | Tanase et al. |
| 6,530,594 | B1 | 3/2003 | Nakajima et al. |
| 6,565,117 | B2 | 5/2003 | Kubota et al. |
| 6,619,690 | B2 | 9/2003 | Tanase et al. |
| 6,623,031 | B2 | 9/2003 | Haland et al. |
| 6,644,687 | B2 | 11/2003 | Saito et al. |
| 6,672,027 | B2 | 1/2004 | Mizutani et al. |
| 6,719,321 | B2 | 4/2004 | Yasuhara et al. |
| 6,736,421 | B2 | 5/2004 | Blake, III et al. |
| 6,761,374 | B2 | 7/2004 | Di Sante et al. |
| 6,783,152 | B2 | 8/2004 | Tanase et al. |
| 6,793,239 | B2 | 9/2004 | Feldman et al. |
| 6,808,203 | B2 | 10/2004 | Takahara |
| 6,837,513 | B2 | 1/2005 | Oka et al. |
| 6,848,711 | B2 | 2/2005 | Yamamura et al. |
| 6,863,300 | B2 | 3/2005 | Ryu |
| 6,869,099 | B2 | 3/2005 | Kawasaki et al. |
| 6,883,828 | B2 | 4/2005 | Ohki |
| 6,889,999 | B2 | 5/2005 | Dominissini et al. |
| 6,893,042 | B1 | 5/2005 | Ponceau et al. |
| 6,918,459 | B2 | 7/2005 | Breed |
| 6,942,241 | B2 | 9/2005 | Yamamura et al. |
| 6,974,151 | B2 | 12/2005 | Ochiai et al. |
| 6,974,152 | B2 | 12/2005 | Hanjono |
| 7,172,211 | B2 * | 2/2007 | Hirose ..................... 280/730.2 |
| 2002/0089154 | A1 | 7/2002 | Ogawa et al. |
| 2003/0006589 | A1 | 1/2003 | Aoki et al. |
| 2003/0006591 | A1 | 1/2003 | Yasuhara et al. |
| 2004/0130129 | A1 | 7/2004 | Takahara |
| 2004/0160078 | A1 | 8/2004 | Hwang |
| 2004/0178609 | A1 | 9/2004 | Totsuka et al. |
| 2004/0195809 | A1 | 10/2004 | Tanase et al. |
| 2004/0232664 | A1 | 11/2004 | Tokunaga et al. |
| 2005/0052001 | A1 | 3/2005 | Totani et al. |
| 2005/0116447 | A1 | 6/2005 | Ryu |
| 2005/0236818 | A1 | 10/2005 | Hirose |
| 2005/0253366 | A1 | 11/2005 | Uno et al. |
| 2009/0160165 | A1 * | 6/2009 | Torii ....................... 280/730.2 |

FOREIGN PATENT DOCUMENTS

| | | |
|---|---|---|
| DE | 196 22 231 | 12/1997 |
| EP | 0 841 221 | 5/1998 |
| EP | 0 904 992 | 3/1999 |
| EP | 0 980 795 | 2/2000 |
| GB | 2261 636 | 5/1993 |
| GB | 2372 484 | 8/2002 |
| JP | 2002059802 | 2/2002 |

OTHER PUBLICATIONS

Seatbelts and Air Bags. (Web page) http://subaru.com.mt/html/index.cfm?xmenu=about_subaru.cfm&xPage=http%3A//subaru.com.mt/html/leftframe/middleframe/about_subaru/safety/4/4_2.htm.

Can We Make A Difference in Side Impact and Rollover Accidents? (Web page) Http:/www2.dupont.com/Automotive/en_US/science_of/auto_safety_A.html.

The All New Mazda MX-5-Part Five. (Web page) http://www.carpages.co.uk/mazda/mazda-mx5-part-5-28-06-05.asp?switched=on&echo=975748651.

Volvo raises safety bar with C70 Convertible (Web page) http://www.findarticles.com/p/articles/mi_m0KJI/is_11_117/ai_n15865049.

Ford Freestyle FX: The World's First Purpose-Built Crossover Vehicle (Web page) http://media.ford.com/article_display.cfm?article_id=14043.

Jim Grant's Tech Tips. (Web page) http://www.alldata.com/techtips/1997/19971124b.html.

Safety. (Web page) http://www.honda.co.nz/site/technology/isrs.html.

European Search Report dated Jul. 5, 2007. 6 pages.

* cited by examiner

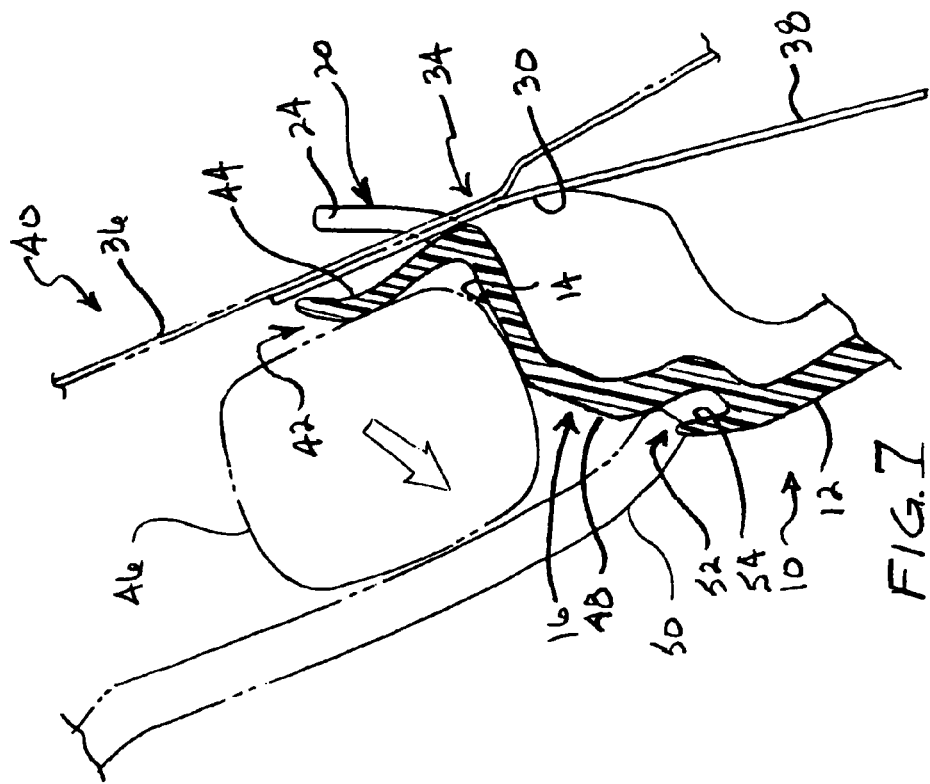
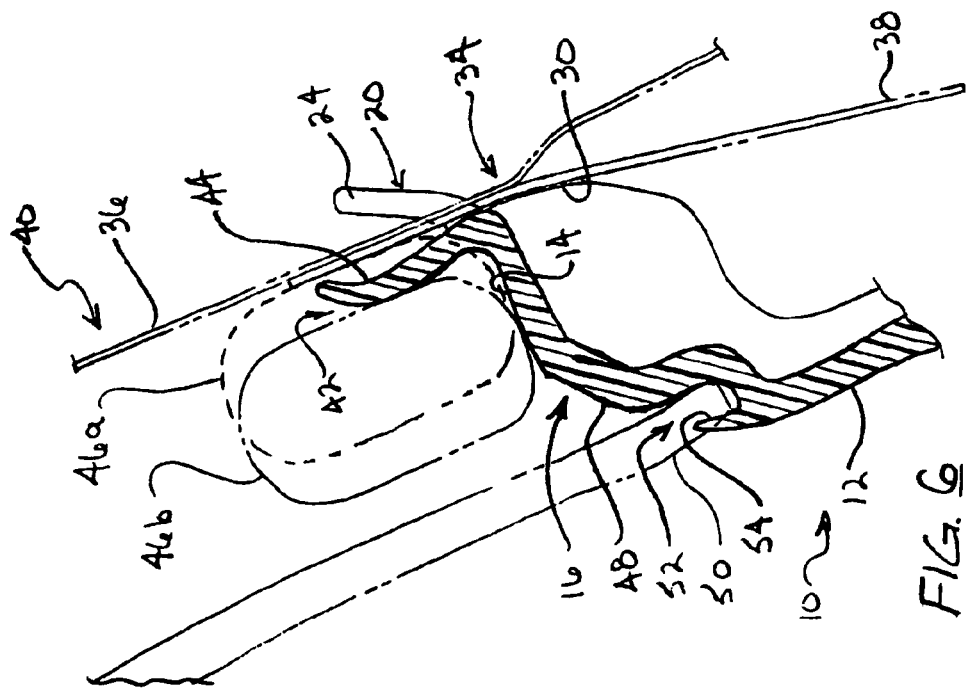

US 7,607,684 B2

INTEGRATED INFLATABLE CURTAIN DEPLOYMENT RAMP INTO VEHICLE BODY TRIM

FIELD OF THE INVENTION

The present invention relates to a pillar trim component and/or pillar structure which can be securely fastened to a motor vehicle body for assisting the deployment and/or support of an airbag located at the juncture with a headliner of the motor vehicle.

BACKGROUND

Various pillar trim component configurations can be seen in U.S. Pat. Nos. 6,893,042; 6,672,027; 6,485,049; 6,485,048; and UK Patent application No. GB 2,372,484. While each of these devices appears to be suitable for its intended purpose, it would be desirable to reduce the number of components requiring assembly during manufacture of the interior of the motor vehicle. It would be desirable to integrate the inflatable curtain ramps into an upper portion of the pillar trim component. It would be desirable to provide an inflatable curtain pusher wall angled inboard with respect to the inflatable curtain or airbag support surface. It would be desirable to provide an inverted T-shaped attachment to simplify installation and to stabilize the location of the pillar trim component. It would be desirable to provide a headliner retaining portion located between a main body portion and an airbag support portion of the pillar trim component. It would be desirable to provide any of the features described above in any desired combination.

SUMMARY

The present invention includes a pillar trim component having a main body portion and an airbag support portion extending from the main body portion. The airbag support portion can have an airbag guide portion. A reinforcement portion can be provided connecting the airbag guide portion to the main body portion.

The pillar structure for a motor vehicle can support a side curtain airbag. The pillar structure according to an embodiment of the present invention can include a pillar panel, and a pillar trim component having a main body portion covering at least a portion of the pillar panel and an airbag support portion extending from the main body portion. The airbag support portion can have an airbag guide portion. A reinforcement portion can be provided connecting the airbag guide portion to the main body portion.

A pillar trim component can include a main body portion and an airbag support portion extending from the main body portion. The airbag support portion can have at least two portions selected from a group consisting of an airbag-positioning portion extending in a direction inboard toward the main body portion, an attachment portion extending in a direction outboard away from the main body portion, a headliner-retaining portion located between the main body portion and the airbag support portion, and any combination thereof.

A pillar trim component can include a main body portion and an airbag support portion extending from the main body portion. The airbag support portion can have a positioning portion extending in a direction inboard toward the main body portion, and an attachment portion extending in a direction outboard away from the main body portion.

A pillar trim component can include a main body portion, and an airbag support portion extending from the main body portion. The airbag support portion can have a positioning portion extending in a direction inboard toward the main body portion, and a headliner retaining portion located between the main body portion and the airbag support portion.

A pillar structure for a motor vehicle having a side curtain airbag can include a pillar panel, and a pillar trim component. The pillar trim component can include a main body portion covering at least a portion of the pillar panel, and an airbag support portion extending from the main body portion. The airbag support portion can have a positioning portion extending in a direction inboard away from the pillar panel, and an attachment portion extending in a direction outward toward the pillar panel and connecting the pillar trim component to the pillar panel.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 6 is a simplified cross sectional view illustrating a side curtain airbag shown in phantom in a first installed position, and the side curtain airbag shown in phantom moved to an inboard position in response to installation of the pillar trim component according to an embodiment of the present invention;

FIG. 7 is a simplified cross sectional view illustrating an early stage of inflation of a side curtain airbag according to an embodiment of the present invention;

DETAILED DESCRIPTION

Figure 1:
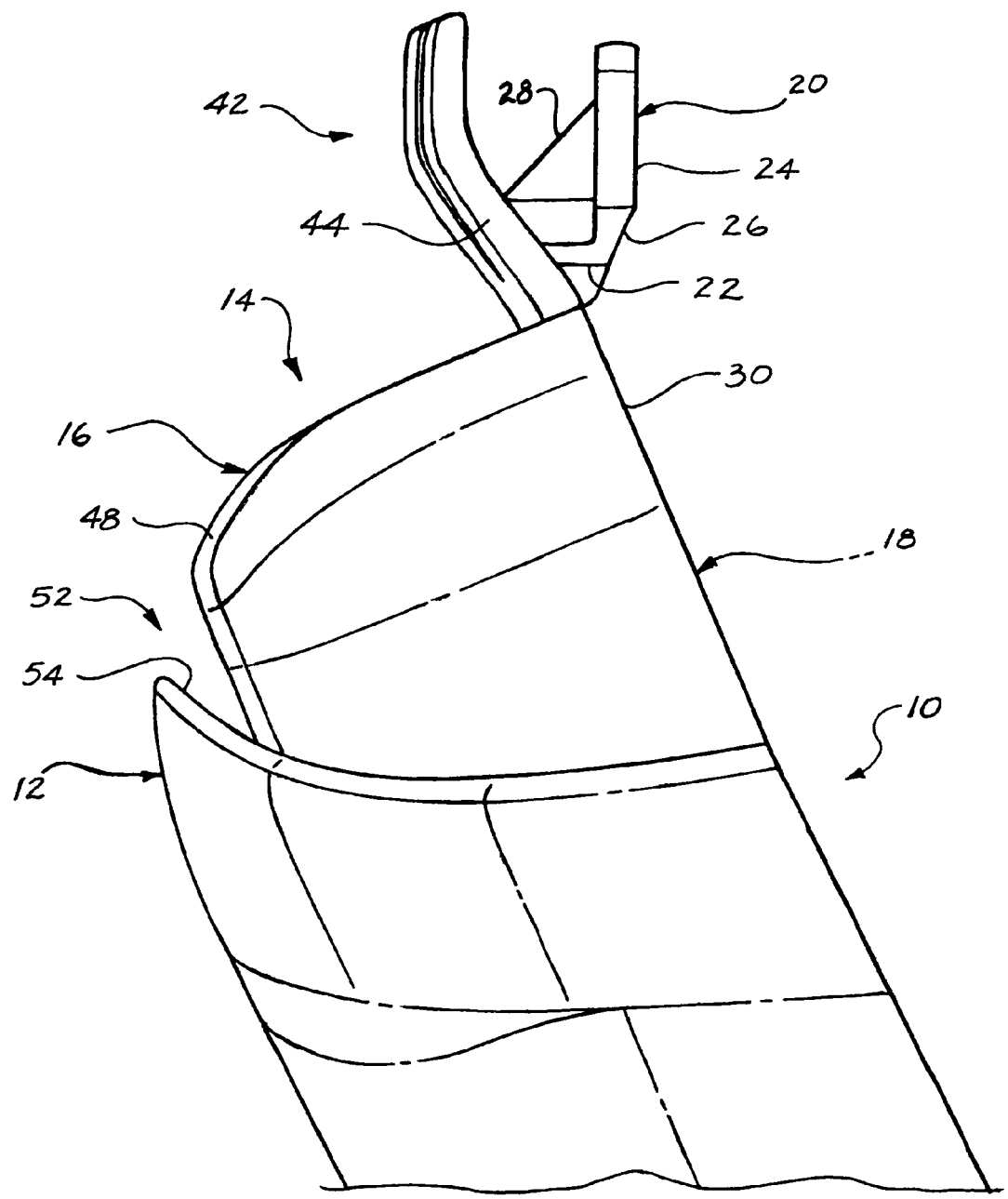
FIG. 1 is a side elevational view of an upper portion of a pillar trim component according to an embodiment of the present invention.

Referring now to FIGS. 1-5, the pillar trim component 10 can include a main body portion 12 and an integral airbag support portion 14 extending from the main body portion 12. The airbag support portion 14 can include an airbag guide portion 16. As shown in FIG. 1, the airbag support portion 14 and airbag guide portion 16, including its deployment surface 48, can together define a curvilinear profile. A reinforcement portion 18 can be provided connecting the airbag guide portion 16 to the main body portion 12.

The pillar trim component 10 according to an embodiment of the present invention can include an attachment portion 20 extending from the airbag support portion 14. The attachment portion 20 can be defined by an outwardly extending portion 22 connected to the airbag support portion 14 and an angled portion 24 connected to an outer end 26 of the outwardly extending portion 22. The attachment portion 20 can also include an inboard stabilizing web 28 extending between the outwardly extending portion 22 and the angled portion 24.

Figure 2:
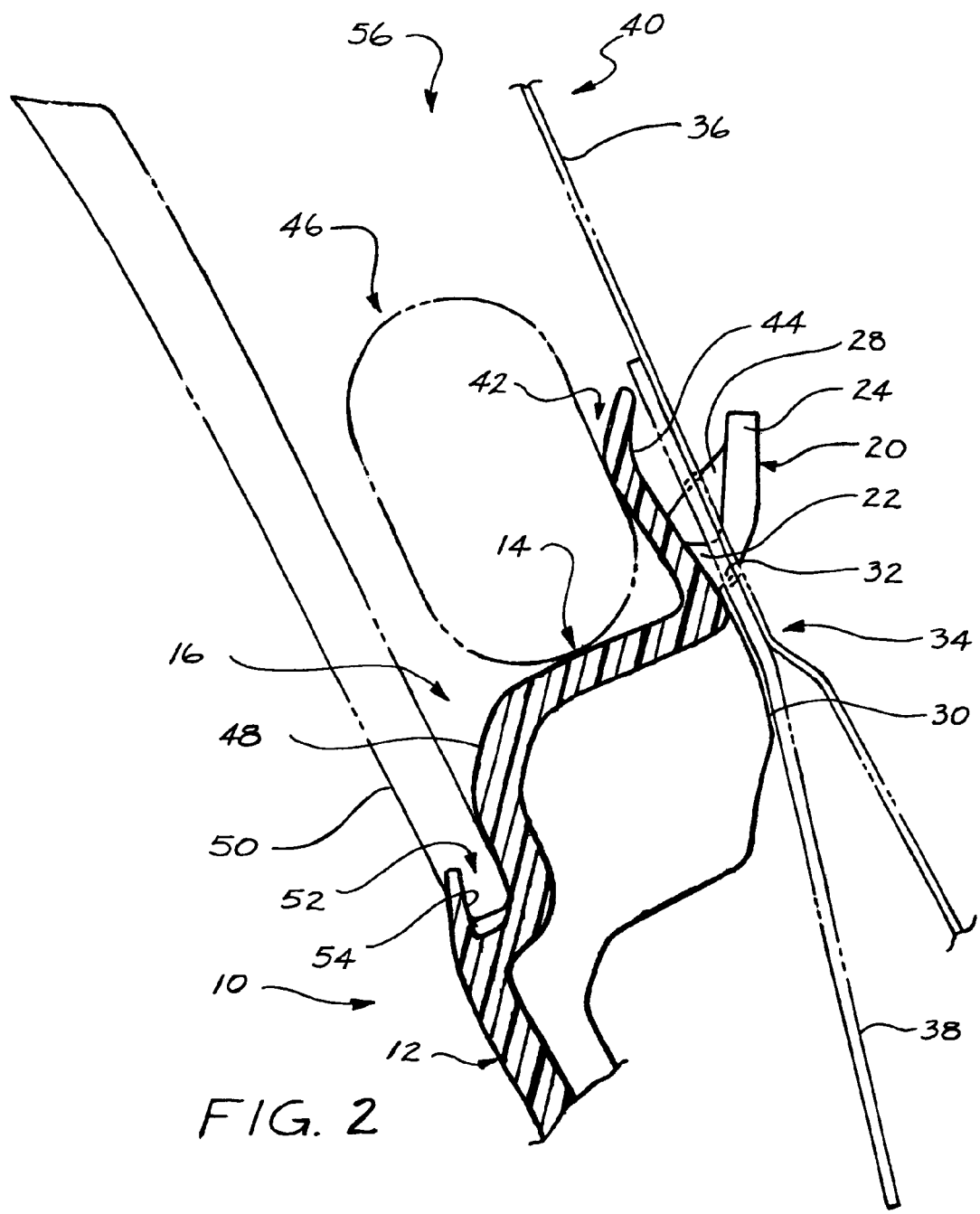
FIG. 2 is a simplified cross sectional view of the pillar trim component of FIG. 1 supporting a side curtain airbag shown in phantom, and connected to a pillar panel and roof portion, such as a roof panel or roof rail, to define a joint shown in phantom at one side and supporting a headliner shown in phantom on an opposite side.
Figure 4:
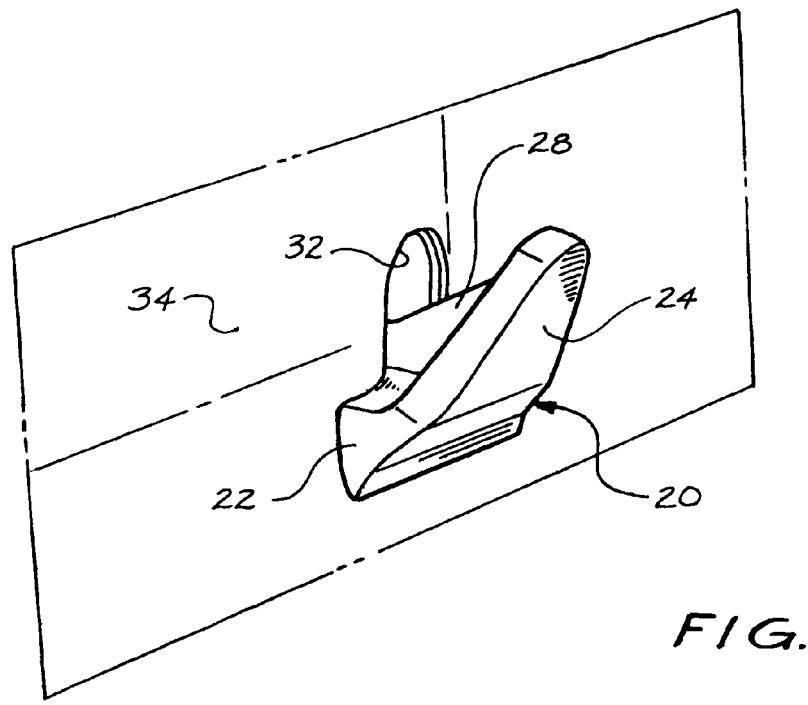
FIG. 4 is a detail view of an inverted T-shaped aperture formed in the pillar panel and the roof portion, such as a roof panel or a roof rail, to define a joint for receiving an attachment portion according to an embodiment of the present invention.
Figure 5:
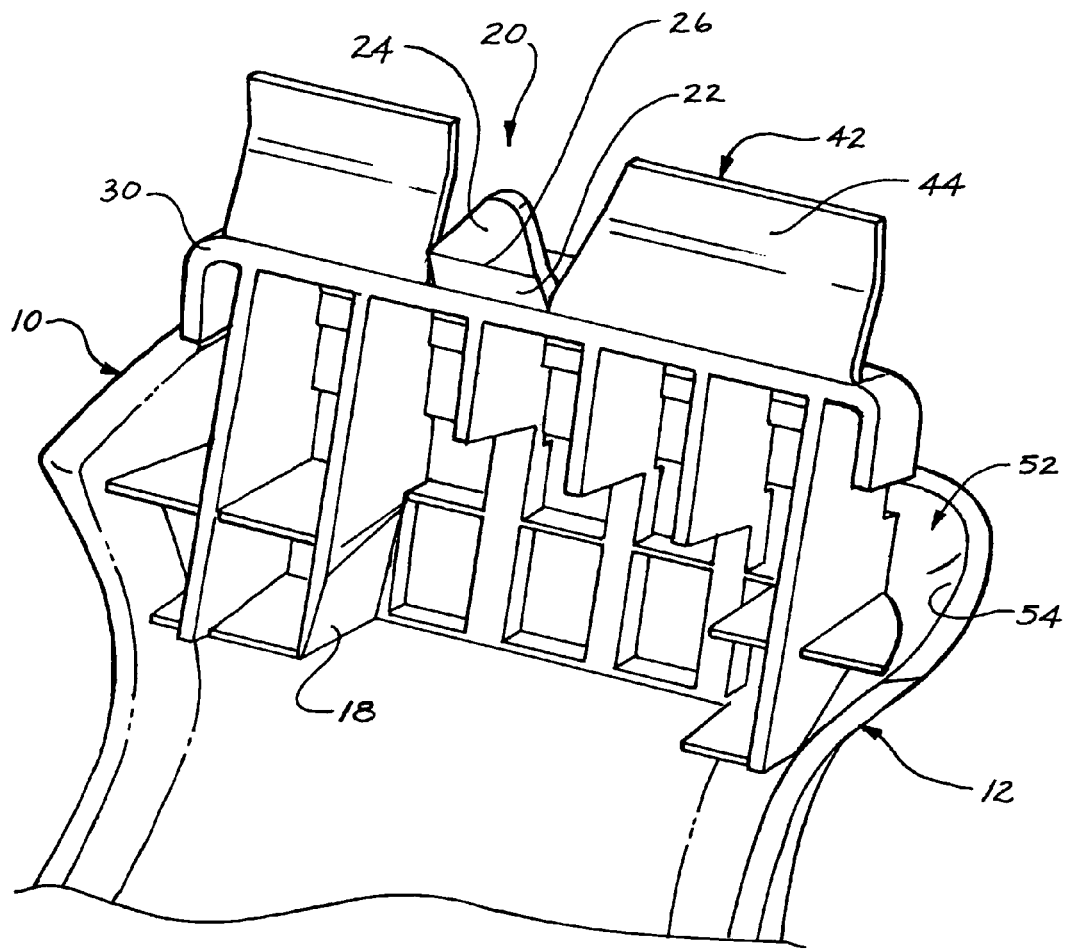
FIG. 5 is a rear elevational perspective view of the upper portion of the pillar trim component according to an embodiment of the present invention.

As best seen in FIGS. 2 and 4, the attachment portion 20 extends outwardly from a rear surface 30 of the pillar trim component 10 for engagement through a corresponding aperture 32. The aperture 32 can be formed in a joint 34 where a portion 36 of a roof, such as a roof panel or roof rail, connects to a pillar panel 38 to define a portion of a motor vehicle body 40. As best seen in FIG. 4, the aperture 32 can be defined by an inverted T-shaped periphery extending through the joint 34 of the roof portion 36 and pillar panel 38. The inboard stabilizing web 28 can operably interact with the upwardly extending portion of the periphery defining the aperture 32 in order to locate and stabilize the pillar trim component 10 in a horizontal front to rear direction of the motor vehicle 40. The outwardly extending portion 22 of the attachment portion 20 can operably interact with the horizontally extending portions of the periphery defining the aperture 32 in order to locate and stabilize the pillar trim component 10 in the vertical bottom to top direction of the motor vehicle body 40.

Figure 3:
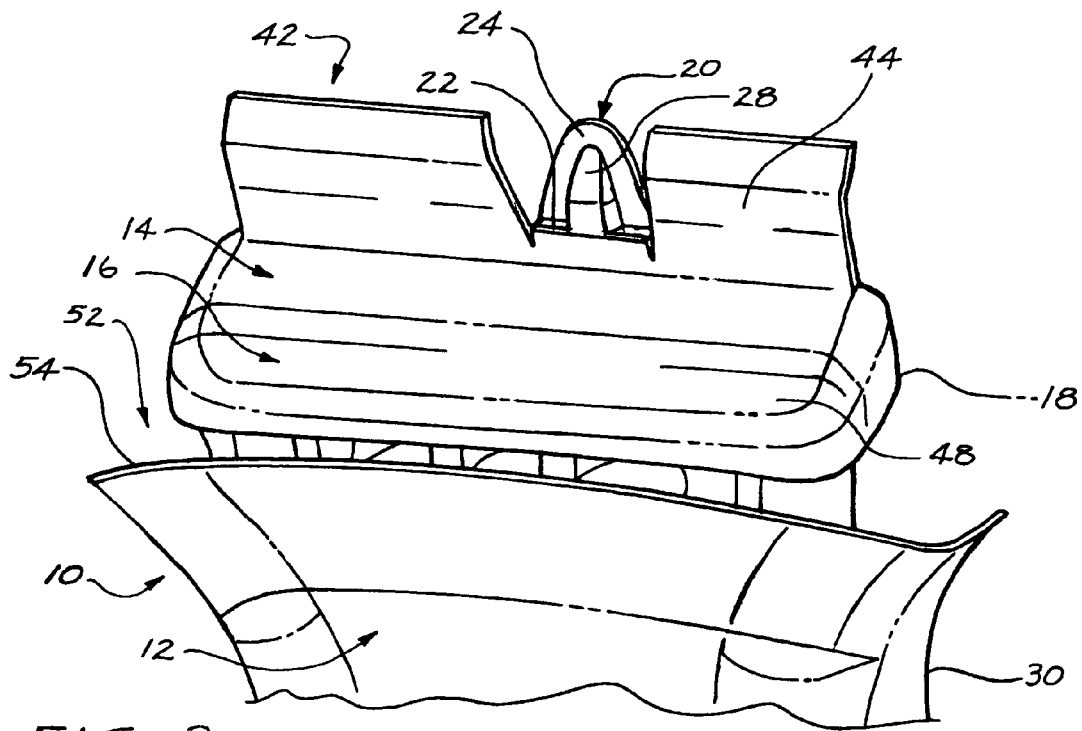
FIG. 3 is a perspective front elevational view of the upper portion of the pillar trim component according to an embodiment of the present invention.

Referring now to FIGS. 1-3, the pillar trim component 10 can include an airbag positioning portion 42 extending from the airbag support portion 14 in a direction inboard with respect to the motor vehicle body 40 toward the airbag guide portion 16. The airbag positioning portion 42 can be defined by at least a portion of an upwardly extending wall 44 of the airbag support portion 14 angled in an inboard direction with respect to the motor vehicle body 40 toward the airbag guide portion 16. The inboard angled portion of the upwardly extending wall 44 locates the supported side curtain airbag 46 (shown in phantom) spaced in an inboard direction toward a centerline of the motor vehicle body 40 as best seen in FIG. 2. The attachment portion 20 can be located between two upwardly extending walls 44 of the airbag positioning portion 42.

The airbag guide portion 16 can include a deployment surface 48 located above the main body portion 12. The deployment surface 48 can extend between the main body portion 12 and the airbag support portion 14. A portion of the deployment surface 48 of the airbag guide portion 16 can define a plane. The deployment surface 48 can direct the expansion of the side curtain airbag 46 in an inboard direction toward a centerline of the motor vehicle body 40 through a gap that can be created in a joint between a headliner 50 and the pillar trim component 10. The pillar trim component 10 can include a headliner retaining portion 52 located between the main body portion 12 and the airbag support portion 14. The headliner retaining portion 52 can include a recess 54 formed between the airbag support portion 14 and the main body portion 12. The recess 54 can be located between the deployment surface 48 and the main body portion 12.

A pillar structure 56 (as best seen in FIG. 2) for a motor vehicle body 40 having a side curtain airbag 46 can include pillar panel 38 and a pillar trim component 10. The pillar trim component 10 can include a main body portion 12 covering at least a portion of the pillar panel 38 and an airbag support portion 14 extending from the main body portion 12. The airbag support portion 14 can include an airbag guide portion 16. A reinforcement portion 18 can be provided connecting the airbag guide portion 16 to the main body portion 12. The pillar trim component 10 can include an attachment portion 20 extending from the pillar trim component 10 and connecting the pillar trim component 10 to the pillar panel 38. The attachment portion 20 can extend from the airbag support portion 14 of the pillar trim component 10. A side curtain airbag positioning portion 42 can extend from the airbag support portion 14 in a direction inboard with respect to a centerline of the motor vehicle body 40 away from the pillar panel 38. The side curtain airbag positioning portion 42 can extend from the airbag support portion 14 of the pillar trim component 10 in an inboard direction with respect to a centerline of the motor vehicle body 40 toward the airbag guide portion 16. The attachment portion 20 can be located between two upwardly extending wall portions 44 of the airbag positioning portion 42. The airbag guide portion 16 can include a deployment surface 48 located above the main body portion 12. The pillar panel 38 can be connected to the roof portion 36, such as a roof rail or a roof panel, to define a joint 34. An aperture 32 can extend through the joint 34 connecting the roof portion 36 to the pillar panel 38. An inverted T-shaped periphery can be formed through the joint 34 connecting the roof portion 36 and pillar panel 38 to define the aperture 32. The attachment portion 20 can connect the pillar trim component 10 to the roof portion 36 and pillar panel 38 through the inverted T-shaped periphery defining the aperture 32. A headliner retaining portion 52 can be located between the main body portion 12 and the airbag support portion 14 of the pillar trim component 10.

The airbag support portion 14 can have at least two portions selected from a group consisting of an airbag-positioning portion 42 extending in a direction inboard toward the main body portion 12, an attachment portion 20 extending in a direction outboard away from the main body portion 12, a headliner-retaining portion 52 located between the main body portion 12 and the airbag support portion 14, and any combination thereof. The airbag positioning portion 42 can be defined by at least a portion of an upwardly extending wall 44 of the airbag support portion 14 angled inboard toward the main body portion 12. The attachment portion 20 can be defined by an outwardly extending portion 22 connected to the airbag support portion 14, an angled portion 24 connected to an outer end 26 of the outwardly extending portion 22, and an inboard stabilizing web 28 extending between the outwardly extending portion 22 and the angled portion 24. The headliner-retaining portion 52 can be defined by a recess 54 formed between the airbag support portion 14 and the main body portion 12. The pillar trim component 10 can include an airbag guide portion 16 defined by an airbag deployment surface 48 located between the main body portion 12 in the airbag support portion 14. The pillar trim component 10 can include a reinforcement portion 18 defined by an integral wall connecting the main body portion 12 to the airbag support portion 14.

The pillar trim component 10 according to an embodiment of the present invention can include a main body portion 12, and an airbag-support portion 14 extending from the main body portion 12. The airbag-support portion 14 can include an airbag-positioning portion 42 extending in a direction inboard toward the main body portion 12, and an attachment portion 20 extending in a direction outboard away from the main body portion 12.

The pillar trim component 10 according to an embodiment of the present invention can include a main body portion 12, and an airbag-support portion 14 extending from the main body portion 12. The airbag-support portion 14 can have an airbag-positioning portion 42 extending in a direction inboard toward the main body portion 12, and a headliner-retaining portion 52 located between the main body portion 12 and the airbag-support portion 14.

According to an embodiment of the present invention, an inflatable curtain deployment trajectory ramp 16 can be integrated into the pillar trim component 10 and can include a side curtain airbag positioning feature 42. The pillar trim component 10 having the integrated inflatable curtain deployment trajectory ramp 16 and side curtain airbag positioning feature 42 can also include a pillar trim to body interlock or attachment portion 20 for eliminating the need for separate pillar trim fastening devices.

Figure 9:
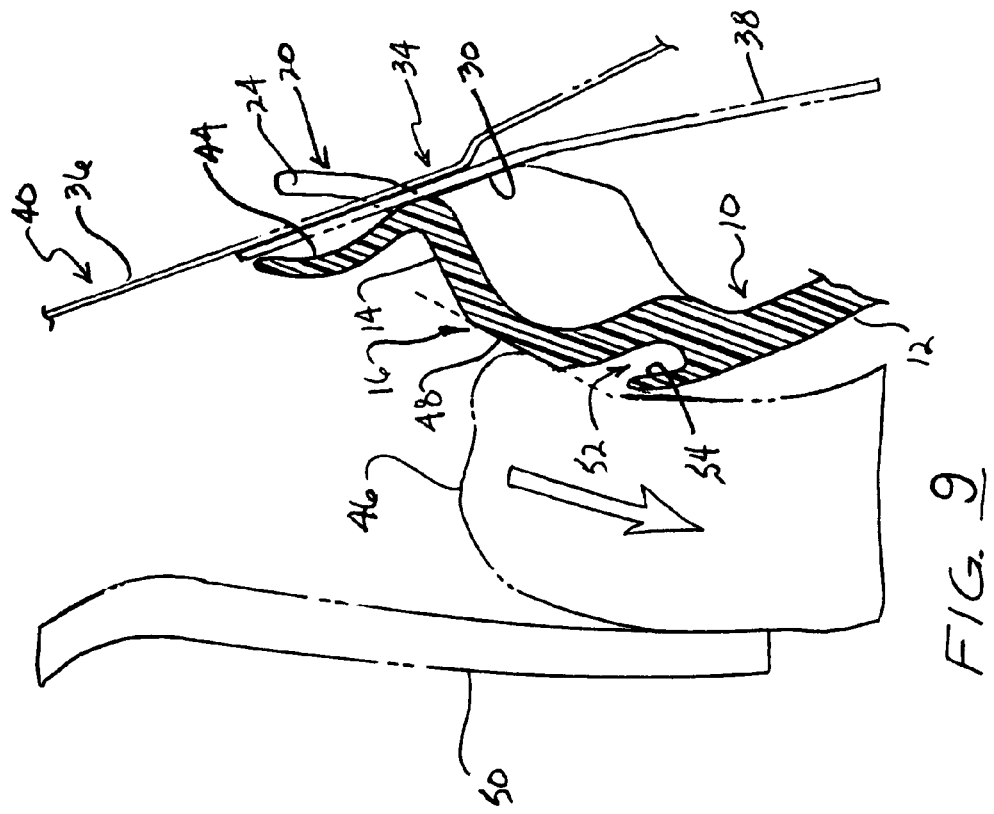
FIG. 9 is a simplified cross sectional view illustrating a late stage of inflation of a side curtain airbag according to an embodiment of the present invention.
Figure 8:
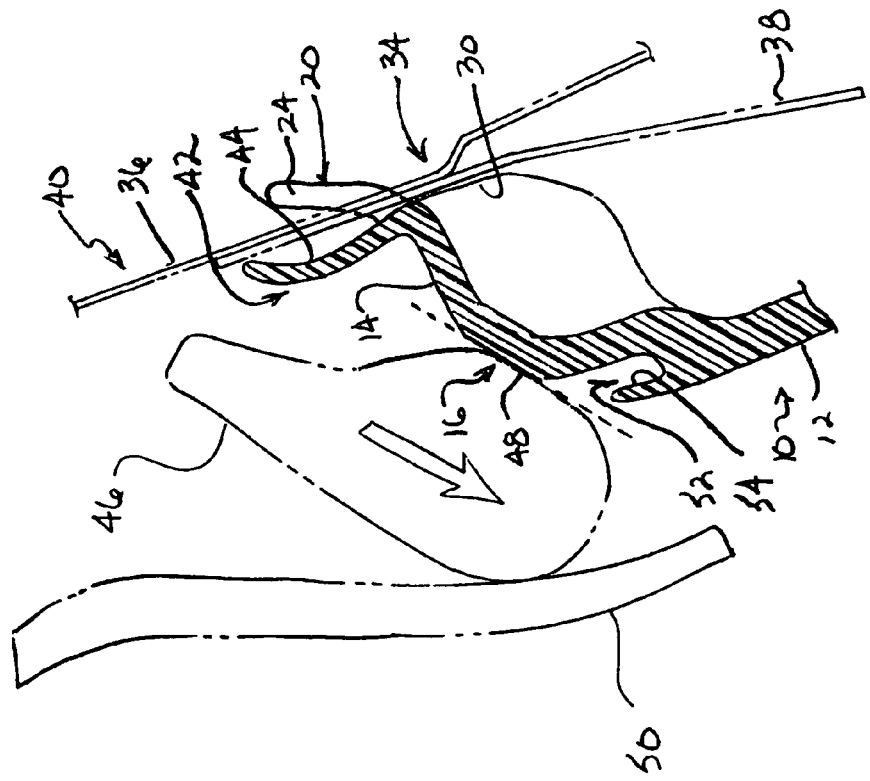
FIG. 8 is a simplified cross sectional view illustrating an intermediate stage of inflation of a side curtain airbag according to an embodiment of the present invention.

Referring now to FIGS. 6-9, in operation an inflatable side curtain airbag 46 can be supported in a stowed position by the integral airbag support portion 14 of the pillar trim component 10. As best seen in FIG. 6, an installed airbag 46 is "pushed" into a more desirable pre-deployment position by the integrally formed airbag positioning portion 42 including the upwardly extending wall 44 angled inboard toward the main body portion 12 of the pillar trim component 10 during installation of the pillar trim component 10. The headliner 50 can interact with the retaining portion or recess of the center pillar trim component 10 formed in the vehicle inboard side of the integrated ramp or deployment surface 48. The configuration of the headliner retaining portion 52 interacts with the headliner 50 to maintain the headliner 50 in a snug condition between the recess 54 and the integrated ramp vehicle inboard surface 48 located between the main body portion 12 and airbag support portion 14, as best seen in FIG. 6. As best seen in FIG. 7, during initial early stage deployment of the inflatable side curtain airbag, the airbag pushes against a backside of the headliner 50 which then pulls a lower edge of the headliner 50 away from the recess 54 and the integrated deployment surface 48. At the same time, if the vehicle body sheet metal is pushed inboard, the unevenly formed airbag positioning portion 42 of the pillar trim component 10 can keep the side curtain airbag moving inboard at the same speed and at the same time as the remaining portions of the pillar trim component 10. While continuing deployment of the inflatable side curtain airbag, the airbag further pushes on the backside of the headliner 50 which then continues to flex on itself in a vehicle inboard direction. As best seen in FIG. 8, the integrated deployment surface 48 aids the deploying side curtain airbag to cross over the edge of the recess 54 formed in the pillar trim component 10 during an intermediate stage of inflatable side curtain airbag deployment. The airbag deployment surface 48 can extend inboard at an angle of sufficient magnitude to prevent contact by a deploying airbag with an upper edge of the headliner retaining portion 52. Continued deployment of the inflatable side curtain airbag pushes against the backside of the headliner 50 and crosses over the upper edge of the recess 54 formed in the pillar trim component 10 and then proceeds to a fully deployed position as best seen in FIG. 9. The integrated ramp or deployment surface 48 is useful in reducing the force of any impact, since the back side ribs or reinforcement portion 18 of the pillar trim component 10 can be allowed to deform slightly to slow down an impacting projectile.

Referring again to FIG. 6, during assembly of the pillar component 10 to the motor vehicle body 40, an installer can begin installation of the pillar trim component 10 by slipping the airbag positioning portion behind a previously installed side curtain airbag located at an initial position 46a, followed by insertion of the attachment portion 20 into the aperture 32. After initial insertion of the outer end of the attachment portion 20, the installer can move the pillar trim component 10 in an upward direction while moving the pillar trim component 10 simultaneously in an outboard direction. This motion causes the side curtain airbag to be repositioned in an inboard direction by the airbag-positioning portion 42 of the upwardly extending wall 44 of the airbag support portion to a pre-deployment stowed position 46b. When attachment portion 20 is fully engaged in the corresponding aperture 32, any suitable means can be used for attaching a lower portion of the pillar trim component 10. To remove the pillar trim component 10, an operator can pull a lower end of the pillar trim component 10 inboard to release the lower end fastener. The pillar trim component 10 is then moved in an inboard direction while simultaneously lowering the pillar trim component 10 to release the attachment portion 20 from the corresponding aperture 32.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A pillar structure for a motor vehicle having a side curtain airbag, comprising:
    a pillar panel; and
    a pillar trim component comprising:
        a main body portion covering at least a portion of the pillar panel;
        an airbag support portion extending from the main body portion, the airbag support portion having an airbag guide portion, and a reinforcement portion connecting the airbag guide portion to the main body portion; and
        an airbag positioning portion extending at an angle from the airbag support portion, the airbag positioning portion including an airbag contact surface disposed outboard of an airbag supported by the airbag support portion and a distal end extending outboard from the airbag contact surface.

2. The pillar structure of claim 1 further comprising:
    an attachment portion extending from the pillar trim component and connecting the pillar trim component to the pillar panel.

3. The pillar structure of claim 2, wherein the attachment portion extends from the airbag support portion.

4. The pillar structure of claim 1, wherein the airbag positioning portion extends from an opposing side of the airbag support portion than the airbag guide portion.

5. The pillar structure of claim 1, wherein the airbag positioning portion between a proximal end and the airbag contact surface extends from the airbag support portion inboard toward the airbag guide portion.

6. The pillar structure of claim 5 further comprising:
    an attachment portion extending from the airbag support portion and connecting the pillar trim component to the pillar panel, the attachment portion located between two upwardly extending walls of the airbag positioning portion.

7. The pillar structure of claim 1 further comprising:
a roof portion; and
a pillar panel connected to the roof portion and an aperture extending through both the roof portion and the pillar panel.

8. The pillar structure of claim 7, wherein an inverted T-shaped periphery formed through both the roof portion and the pillar panel defines the aperture.

9. The pillar structure of claim 8 further comprising:
an attachment portion connecting the pillar trim component to the roof portion and pillar panel through the inverted T-shaped periphery defining the aperture.

10. The pillar structure of claim 1 further comprising:
a headliner retaining portion located between the main body portion and the airbag support portion.

11. The pillar structure of claim 10, wherein the airbag guide portion is defined by a deployment surface located above the main body portion, and wherein the deployment surface is angled relative to the airbag support portion, wherein a portion of the deployment surface defines a plane that passes above the headliner retainer portion.

12. A pillar trim component comprising:
a main body portion;
an airbag support portion extending from the main body portion, the airbag support portion having an airbag guide portion, and a reinforcement portion connecting the airbag guide portion to the main body portion; and
a bow-shaped airbag positioning portion having an airbag contact surface, a lower portion extending inboard from a proximate end of the airbag positioning portion to the airbag contact surface, and an upper portion extending outboard from the airbag contact surface to a distal end of the airbag positioning portion.

13. The pillar trim component of claim 12 further comprising:
an attachment portion extending from the airbag support portion.

14. The pillar trim component of claim 13, wherein the attachment portion is defined by an outwardly extending portion connected to the airbag support portion and an angled portion connected to an outer end of the outwardly extending portion.

15. The pillar trim component of claim 14, wherein the attachment portion is further defined by an inboard stabilizing web extending between the outwardly extending portion and the angled portion.

16. The pillar trim component of claim 12, wherein the airbag contact surface of the airbag positioning portion is further inboard than an outboard side of the airbag support portion and the distal end of the airbag positioning portion.

17. The pillar trim component of claim 16, wherein the airbag positioning portion is defined by at least a portion of an upwardly extending wall angled inboard relative to a line orthogonal to the airbag support portion.

18. The pillar structure of claim 17 further comprising:
an attachment portion extending from the airbag support portion, the attachment portion located between two upwardly extending walls of the airbag positioning portion.

19. The pillar trim component of claim 12 further comprising:
a headliner retaining portion located between the main body portion and the airbag support portion.

20. The pillar trim component of claim 19, wherein the airbag guide portion is defined by a deployment surface located above the main body portion and extending between the main body portion and the airbag support portion, the deployment surface angled relative to the airbag support portion, wherein a portion of the deployment surface defines a plane that slopes vertically downward as it extends inboard, the plane extending above the headliner retaining portion.

21. The pillar trim component of claim 19, wherein the headliner retaining portion is defined by a recess formed between the airbag support portion and the main body portion.

22. A pillar trim component comprising:
a main body portion; and
an airbag support portion extending from the main body portion;
a bow-shaped airbag positioning portion extending vertically upward from an outboard side of the airbag support portion and having a lower portion extending in a direction inboard toward the main body portion and an upper portion extending outboard away from the main body portion;
an attachment portion extending in a direction outboard away from the main body portion; and
an airbag guide portion extending from an inboard side of the airbag support portion and angled relative to the airbag support portion.

23. A method for positioning an airbag in a vehicle comprising:
slipping an outboard angled distal end of a bow-shaped airbag-positioning portion of a trim component between a vehicle body element and a previously installed airbag connected to the vehicle body element; and
repositioning the airbag slightly inboard from the vehicle body element by urging the airbag inboard with the bow-shaped airbag-positioning portion while connecting the trim component to the vehicle body element.

24. The method of claim 23, wherein the airbag is a side curtain airbag, the vehicle body element is a roof rail, and the trim component is a pillar trim component operable to move the side curtain airbag away from the roof rail during installation of the pillar trim component.

25. The method of claim 23 further comprising:
supporting the airbag on an airbag support portion of the trim component.

26. The method of claim 23 further comprising:
inserting an attachment portion extending outboard from an airbag support portion of the trim component into an aperture formed through the vehicle body element.

27. The method of claim 26, wherein inserting an attachment portion further comprises:
inserting an upwardly extending part of the attachment portion into an inverted T-shaped aperture formed in the vehicle body element; and
moving a lower portion of the trim component outboard and upward to engage an inverted T-shaped cross section of the attachment portion through the inverted T-shaped aperture formed in the vehicle body element as the airbag positioning portion of the trim component moves the airbag in an inboard direction away from the vehicle body element.

28. A pillar trim component comprising:
a main body portion;
an airbag support portion extending from the main body portion;
a headliner-retaining portion located between the main body portion and the airbag support portion;
an airbag guide portion defined by an airbag deployment surface located between the airbag support portion and the headliner-retaining portion, the airbag deployment surface angled relative to the airbag support portion and extending inboard at an angle of sufficient magnitude to prevent contact by a deploying airbag with an upper edge of the headliner-retaining portion; and an airbag-positioning portion having a lower end extending inboard from the airbag support portion toward the main body portion and an upper end extending outboard from the lower end.

29. The pillar trim component of claim 28, wherein the airbag positioning portion is defined by a bow-shaped upwardly extending wall of the airbag support portion having a proximal end angled inboard toward the main body portion and a distal end angled outward.

30. The pillar trim component of claim 29 further comprising:

an attachment portion extending from the airbag support portion, the attachment portion located between two upwardly extending walls of the airbag positioning portion.

31. The pillar trim component of claim 28 further comprising:

an attachment portion extending from the airbag support portion in a direction outboard away from the main body portion.

32. The pillar trim component of claim 31, wherein the attachment portion is defined by an outwardly extending portion connected to the airbag support portion, an angled portion connected to an outer end of the outwardly extending portion, and an inboard stabilizing web extending between the outwardly extending portion and the angled portion.

33. The pillar trim component of claim 28 wherein the headliner retaining portion is defined by a recess formed between the airbag guide portion and the main body portion.

34. The pillar trim component of claim 28 further comprising:

a reinforcement portion defined by an integral wall connecting the main body portion and the airbag support portion.

* * * * *